United States Patent
Shaw et al.

(10) Patent No.: US 9,852,649 B2
(45) Date of Patent: *Dec. 26, 2017

(54) METHOD AND SYSTEM FOR TEACHING VOCABULARY

(75) Inventors: Gordon L. Shaw, Laguna Beach, CA (US); Mark Bodner, Placentia, CA (US); Linda M. Rodgers, Los Alamitos, CA (US)

(73) Assignee: Mind Research Institute, Irvine, CA (US)

( * ) Notice: Subject to any disclaimer, the term of this patent is extended or adjusted under 35 U.S.C. 154(b) by 647 days.

This patent is subject to a terminal disclaimer.

(21) Appl. No.: 11/673,414

(22) Filed: Feb. 9, 2007

(65) Prior Publication Data

US 2007/0134630 A1 Jun. 14, 2007

Related U.S. Application Data

(63) Continuation of application No. 10/319,254, filed on Dec. 12, 2002, now Pat. No. 7,182,600.

(60) Provisional application No. 60/340,514, filed on Dec. 13, 2001.

(51) Int. Cl.
  *G09B 5/00* (2006.01)
  *G09B 7/02* (2006.01)

(52) U.S. Cl.
  CPC ..................... *G09B 7/02* (2013.01)

(58) Field of Classification Search
  CPC ........................................... G09B 5/00
  USPC ....... 434/118, 156, 247, 322, 323, 350, 353, 434/367, 169
  See application file for complete search history.

(56) References Cited

U.S. PATENT DOCUMENTS

| | | | |
|---|---|---|---|
| 3,596,377 A | | 8/1971 | Abbey |
| 3,698,277 A | | 10/1972 | Barra |
| 4,402,249 A | | 9/1983 | Zankman |
| 4,416,182 A | | 11/1983 | Wise et al. |
| 4,820,165 A | | 4/1989 | Kanapa |
| 4,867,685 A | | 9/1989 | Brush et al. |
| 5,059,127 A | | 10/1991 | Lewis et al. |
| 5,169,342 A | * | 12/1992 | Steele et al. .................. 434/112 |

(Continued)

FOREIGN PATENT DOCUMENTS

WO WO2007/028142 8/2007

OTHER PUBLICATIONS

Shaw, G.L., "Keeping Mozart in Mind," M.I.N.D. Institute/University of California, Academic Press, 2000, Cover Page, Table of Contents, Chapters 2, 12, 13, 14, 18, 19, 20, 23.

(Continued)

*Primary Examiner* — Sam Yao
*Assistant Examiner* — Alvin Carlos
(74) *Attorney, Agent, or Firm* — Knobbe Martens Olson & Bear LLP

(57) ABSTRACT

A method using a spatial-temporal software game for both teaching math concepts to a child and for scoring the child's proficiency in these math concepts. These scores are compared with the child's performance on a language-based test of the math concepts. If the child's score on the language-based test is lower than what is reflected by the child's game scores, instruction is given the child using stories and flashcards related to the spatial-temporal software games so that the child will relate vocabulary terms with the math concepts and characters in the temporal-spatial software game.

24 Claims, 2 Drawing Sheets

(56) References Cited

U.S. PATENT DOCUMENTS

| | | | |
|---|---|---|---|
| 5,261,823 A * | 11/1993 | Kurokawa | 434/323 |
| 5,302,132 A | 4/1994 | Corder | |
| 5,447,166 A * | 9/1995 | Gevins | 600/544 |
| 5,447,438 A | 9/1995 | Watanabe et al. | |
| 5,478,240 A * | 12/1995 | Cogliano | 434/327 |
| 5,486,112 A * | 1/1996 | Troudet et al. | 434/250 |
| 5,533,903 A | 7/1996 | Kennedy | |
| 5,574,238 A | 11/1996 | Mencher | |
| 5,584,699 A * | 12/1996 | Silver | 434/201 |
| 5,590,057 A | 12/1996 | Fletcher et al. | |
| 5,618,182 A * | 4/1997 | Thomas | 434/323 |
| 5,690,496 A | 11/1997 | Kennedy | |
| 5,727,951 A | 3/1998 | Ho et al. | |
| 5,746,605 A | 5/1998 | Kennedy | |
| 5,779,486 A | 7/1998 | Ho et al. | |
| 5,783,764 A | 7/1998 | Amar | |
| 5,797,130 A | 8/1998 | Nelson et al. | |
| 5,806,056 A | 9/1998 | Hekmatpour | |
| 5,810,605 A | 9/1998 | Siefert | |
| 5,820,386 A | 10/1998 | Sheppard | |
| 5,822,745 A | 10/1998 | Hekmatpour | |
| 5,827,066 A * | 10/1998 | Henter | 434/188 |
| 5,841,655 A | 11/1998 | Stocking et al. | |
| 5,842,868 A * | 12/1998 | Phillips | 434/170 |
| 5,870,731 A * | 2/1999 | Trif et al. | 706/52 |
| 5,870,768 A | 2/1999 | Hekmatpour | |
| 5,886,273 A | 3/1999 | Haruyama et al. | |
| 5,904,485 A * | 5/1999 | Siefert | 434/322 |
| 5,907,831 A * | 5/1999 | Lotvin et al. | 705/14.27 |
| 5,934,909 A | 8/1999 | Ho et al. | |
| 5,956,040 A | 9/1999 | Asano et al. | |
| 5,957,699 A | 9/1999 | Peterson et al. | |
| 5,987,302 A | 11/1999 | Driscoll et al. | |
| 5,987,443 A | 11/1999 | Nichols et al. | |
| 6,000,945 A | 12/1999 | Sanchez-Lazer et al. | |
| 6,020,886 A | 2/2000 | Jacober et al. | |
| 6,030,226 A | 2/2000 | Hersh | |
| 6,045,515 A | 4/2000 | Lawton | |
| 6,047,261 A | 4/2000 | Siefert | |
| 6,072,113 A | 6/2000 | Tohgi et al. | |
| 6,077,085 A * | 6/2000 | Parry et al. | 434/322 |
| 6,112,049 A | 8/2000 | Sonnenfeld | |
| 6,118,973 A | 9/2000 | Ho et al. | |
| 6,144,838 A * | 11/2000 | Sheehan | 434/362 |
| 6,155,971 A | 12/2000 | Calhoun et al. | |
| 6,164,971 A | 12/2000 | Figart | |
| 6,166,314 A | 12/2000 | Weinstock et al. | |
| 6,186,794 B1 | 2/2001 | Brown et al. | |
| 6,206,700 B1 | 3/2001 | Brown et al. | |
| 6,213,956 B1 | 4/2001 | Lawton | |
| 6,270,352 B1 * | 8/2001 | Ditto | 434/118 |
| 6,281,422 B1 | 8/2001 | Kawamura | |
| 6,288,315 B1 | 9/2001 | Bennett | |
| 6,334,779 B1 | 1/2002 | Siefert | |
| 6,336,813 B1 | 1/2002 | Siefert | |
| 6,352,475 B1 | 3/2002 | Mraovic | |
| 6,364,666 B1 * | 4/2002 | Jenkins et al. | 434/156 |
| 6,386,883 B2 | 5/2002 | Siefert | |
| 6,388,181 B2 | 5/2002 | Moe | |
| 6,390,918 B1 | 5/2002 | Yagi et al. | |
| 6,418,298 B1 | 7/2002 | Sonnenfeld | |
| 6,419,496 B1 | 7/2002 | Vaughan, Jr. | |
| 6,435,508 B1 * | 8/2002 | Tavel | 273/292 |
| 6,480,698 B2 * | 11/2002 | Ho et al. | 434/362 |
| 6,484,010 B1 | 11/2002 | Sheehan | |
| 6,486,388 B2 | 11/2002 | Akahori | |
| 6,513,042 B1 | 1/2003 | Anderson et al. | |
| 6,514,084 B1 | 2/2003 | Thomas | |
| 6,526,258 B2 | 2/2003 | Bejar et al. | |
| 6,565,359 B2 * | 5/2003 | Calhoun et al. | 434/236 |
| 6,582,235 B1 | 6/2003 | Tsai et al. | |
| 6,629,892 B2 | 10/2003 | Oe et al. | |
| 6,644,973 B2 | 11/2003 | Oster | |
| 6,648,648 B1 * | 11/2003 | O'Connell | 434/188 |
| 6,676,412 B1 | 1/2004 | Masterson et al. | |
| 6,676,413 B1 | 1/2004 | Best et al. | |
| 6,688,889 B2 | 2/2004 | Wallace et al. | |
| 6,699,123 B2 | 3/2004 | Matsuura et al. | |
| 6,716,033 B1 * | 4/2004 | Lassowsky | 434/205 |
| 6,751,439 B2 | 6/2004 | Tice et al. | |
| 6,755,657 B1 | 6/2004 | Wasowicz | |
| 6,755,661 B2 * | 6/2004 | Sugimoto | 434/322 |
| 6,827,578 B2 | 12/2004 | Krebs et al. | |
| 6,905,340 B2 * | 6/2005 | Stansvik | 434/322 |
| 6,915,286 B2 | 7/2005 | Policastro et al. | |
| 6,978,115 B2 * | 12/2005 | Whitehurst et al. | 434/350 |
| 6,978,244 B2 | 12/2005 | Rovinelli et al. | |
| 7,024,398 B2 * | 4/2006 | Kilgard et al. | 706/25 |
| 7,122,004 B1 * | 10/2006 | Cassily | 600/300 |
| 7,182,600 B2 | 2/2007 | Shaw et al. | |
| 7,184,701 B2 | 2/2007 | Heslip | |
| 7,199,298 B2 | 4/2007 | Funaki | |
| 7,220,907 B2 | 5/2007 | McIntosh | |
| 7,294,107 B2 | 11/2007 | Simon et al. | |
| 7,451,065 B2 | 11/2008 | Pednault et al. | |
| 7,775,866 B2 | 8/2010 | Mizuguchi et al. | |
| 8,083,523 B2 * | 12/2011 | De Ley et al. | 434/169 |
| 8,137,106 B2 * | 3/2012 | De Ley et al. | 434/159 |
| 8,491,311 B2 | 7/2013 | Bodner et al. | |
| 8,577,280 B2 | 11/2013 | Hutchingson et al. | |
| 2001/0018178 A1 | 8/2001 | Siefert | |
| 2001/0023059 A1 | 9/2001 | Toki | |
| 2001/0036620 A1 | 11/2001 | Peer et al. | |
| 2001/0041330 A1 | 11/2001 | Brown et al. | |
| 2001/0046659 A1 * | 11/2001 | Oster | 434/178 |
| 2002/0002411 A1 | 1/2002 | Higurashi et al. | |
| 2002/0005109 A1 | 1/2002 | Miller | |
| 2002/0032733 A1 * | 3/2002 | Howard | 709/204 |
| 2002/0042790 A1 | 4/2002 | Nagahara | |
| 2002/0076684 A1 * | 6/2002 | Blevins et al. | 434/322 |
| 2002/0102522 A1 | 8/2002 | Sugimoto | |
| 2002/0142278 A1 | 10/2002 | Whitehurst et al. | |
| 2002/0150868 A1 | 10/2002 | Yui et al. | |
| 2002/0160347 A1 | 10/2002 | Wallace et al. | |
| 2002/0168100 A1 * | 11/2002 | Woodall | 382/156 |
| 2002/0169822 A1 | 11/2002 | Packard et al. | |
| 2002/0177113 A1 | 11/2002 | Sherlock | |
| 2002/0188583 A1 * | 12/2002 | Rukavina et al. | 706/45 |
| 2003/0009352 A1 | 1/2003 | Bolotinikov et al. | |
| 2003/0017442 A1 | 1/2003 | Tudor et al. | |
| 2003/0017443 A1 | 1/2003 | Kilgore | |
| 2003/0027122 A1 | 2/2003 | Stansvik | |
| 2003/0039948 A1 | 2/2003 | Donahue | |
| 2003/0059759 A1 | 3/2003 | Calhoun et al. | |
| 2003/0077559 A1 * | 4/2003 | Braunberger et al. | 434/322 |
| 2003/0113697 A1 | 6/2003 | Plescia | |
| 2003/0129574 A1 | 7/2003 | Ferriol et al. | |
| 2003/0129576 A1 * | 7/2003 | Wood et al. | 434/362 |
| 2003/0148253 A1 * | 8/2003 | Sacco et al. | 434/322 |
| 2003/0151628 A1 | 8/2003 | Salter | |
| 2003/0151629 A1 | 8/2003 | Krebs et al. | |
| 2003/0157469 A1 | 8/2003 | Embretson | |
| 2003/0165800 A1 * | 9/2003 | Shaw et al. | 434/156 |
| 2003/0167902 A1 | 9/2003 | Hiner et al. | |
| 2003/0167903 A1 | 9/2003 | Funaki | |
| 2003/0176931 A1 | 9/2003 | Pednault et al. | |
| 2003/0232318 A1 | 12/2003 | Altenhofen et al. | |
| 2004/0005536 A1 | 1/2004 | Lai et al. | |
| 2004/0007118 A1 | 1/2004 | Holcombe | |
| 2004/0014017 A1 | 1/2004 | Lo | |
| 2004/0014021 A1 | 1/2004 | Suleiman | |
| 2004/0033475 A1 | 2/2004 | Mizuma et al. | |
| 2004/0039603 A1 | 2/2004 | Hanrahan | |
| 2004/0111310 A1 | 6/2004 | Szlam et al. | |
| 2004/0134630 A1 | 7/2004 | Lahtinen et al. | |
| 2004/0137984 A1 | 7/2004 | Salter | |
| 2004/0166484 A1 | 8/2004 | Budke et al. | |
| 2004/0180317 A1 | 9/2004 | Bodner et al. | |
| 2004/0237756 A1 | 12/2004 | Forbes | |
| 2004/0244564 A1 | 12/2004 | McGregor | |
| 2004/0260584 A1 | 12/2004 | Terasawa | |
| 2005/0064375 A1 | 3/2005 | Blank | |
| 2007/0046678 A1 | 3/2007 | Peterson et al. | |
| 2007/0134630 A1 | 6/2007 | Shaw et al. | |

(56) References Cited

U.S. PATENT DOCUMENTS

| | | |
|---|---|---|
| 2007/0257906 A1 | 11/2007 | Shimura et al. |
| 2007/0265083 A1 | 11/2007 | Ikebata |
| 2007/0281285 A1 | 12/2007 | Jayaweera |
| 2009/0081626 A1 | 3/2009 | Milgram et al. |
| 2009/0325137 A1 | 12/2009 | Peterson et al. |
| 2010/0209896 A1 | 8/2010 | Weary et al. |
| 2014/0186816 A1 | 7/2014 | Peterson et al. |

OTHER PUBLICATIONS

Shaw et al., "Music Training Causes Long-Term Enhancement of Preschool Children's Spatial-Temporal Reasoning" Neurological Research (1997); vol. 19, No. 1; pp. 1-8; Forefront Publishing Group, Wilton, CT, USA.
Bodner, Peterson, Rodgers, Shaw et al., "Spatial-Temporal (ST) Math Video Game Results Show Rapid Learning Curves Supportive of Innate ST Brain Function" Oct. 9, 2006; ScholarOne, Inc., 2000 (2001); 1 page.
Peterson, Bodner, Rodgers, Shaw et al., Music—Math Program Based on Cortical Model Enhances $2^{nd}$ Graders Performance on Advanced Math Concepts and Stanford 9 Math; Oct. 9, 2006; ScholarOne, Inc. (2000); 1 page.
Peterson, Shaw et al., "Enhanced Learning of Proportional Math Through Music Training and Spatial-Temporal Training" Neurological Research(1999) vol. 21; Forefront Publishing Group; pp. 139-152.
Bodner and Shaw, "Symmetry Math Video Game Used to Train Profound Spatial-Temporal Reasoning Abilities Equivalent to Dynamical Knot Theory" American Mathematical Society (2004); vol. 34; pp. 189-202.
Bodner and Shaw, "Symmetry Operations in the Brain: Music and Reasoning" (2001); pp. 1-30.
Peterson, Bodner, Shaw et al., "Innate Spatial-Temporal Reasoning and the Identification of Genius" Neurological Research, vol. 26, Jan. 2004; W.S. Maney & Son Ltd.; pp. 2-8.
Special Report—Summary of the 2002 M.I.N.D.® Institute newsletter which details data from $2^{nd}$ graders in our Music Spatial-Temporal Math Program (2002) vol. 1, Issue 2; pp. 1-12.
Shaw GL, Bodner M, Patera J "Innate Brain Language and Grammar: Implications for Human Language and Music" In Stochastic Point Processes (eds Srinivasan SK and Vihayakumar A). Narosa Publishing, New Dehli (2003); pp. 287-303.
Bodner M, Shaw GL, "Music Math Connection" Journal of music and movement based learning. (2002) vol. 8, No. 3; pp. 9-16.
Watson S. Wind M, Yee M, Bodner M, Shaw GL., "Effective Music Training for Children with Autism" Early Childhood Connections, (2003); vol. 9; pp. 27-32.
Hu W, Bodner M, Jones EG, Peterson MR, Shaw GL, "Data Mining of Mathematical Reasoning Data Relevant to Large Innate Spatial-Temporal Reasoning Abilities in Children: Implications for Data Driven Education" Soc. Neurosci. Abst. $34^{th}$ annual meeting (2004); 1 page.
Hu W, Bodner M, Jones EG, Peterson M, Shaw GL., "Dynamics of Innate Spatial-Temporal Learning Process: Data Driven Education Results Identify Universal Barriers to Learning" $6^{th}$ Annual International Conference on Complex Systems (2004); 8 pages.
M.I.N.D.® Institute, Research Division, "Education = Music Math Causal Connection", Position Paper #1, Jul. 2002, 2 pages.
M.I.N.D.® Institute, Research Division, "The race to raise a brainer baby", Position Paper #2, Aug. 2002, 1 page.
M.I.N.D.® Institute, Research Division, "Trion Music Game: Breakthrough in the Landmark Math + Music Program", Position Paper #3, Jan. 2003, 1 page.
M.I.N.D.® Institute, Research Division, "Cramming v. Understanding", Position Paper #4, Feb. 2003, 1 page.
Today@UCI: Press Release: Piano and Computer Training Boost Student Math Achievement, UC Irvine Study Shows [online]; Mar. 15, 1999 [retrieved on Mar. 16, 2008]; Retrieved from the Internet: URL:http://today.uci.edu/news/release_detail.asp?key=646.
International Search Report, Application No. PCT/US06/34462, dated Aug. 30, 2007, 2 pgs.
"The Stochastic Learning Curve: Optimal Production in the Presence of Learning-Curve Uncertainty", Joseph B. Mazzola and Kevin F. McCardle; Source: Operations Research, vol. 45, No. 3 (May-Jun. 1997), pp. 440-450.
"Toward a Theory of continuous Improvement and the Learning Curve", Willard I. Zangwill and Paul B. Kantor; Management Science, vol. 44, No. 7 (Jul. 1998), pp. 910-920.
"Rigorous Learning Curve Bounds from Statistical Mechanics" by David Haussler, Michael Kearns, H. Sebastian Seung, Naftali Tishby, (1996), Machine Learning 25, pp. 195-236.
"The Learning Curve: Historical Review and Comprehensive Survey", Louis E. Yelle, Universit of Lowell, pp. 1-27.
"Seer: Maximum Likelihood Regression for Learning-Speed Curves", Carl Myers Kadie, Graduate college of the University of Illinois at Urbana—Champaign, 1995, pp. 1-104.
Kennedy, Brian, Tetris Plus—Jaleco. Review and description of Tetris Plus [online], [retrieved on May 29, 2013]. Retrieved from the Internet <URL:http//dextremes.com/sega/revs/tetrisplus.html>.
Thompson, Jon. Tetris Plus Review. [online], [retrieved on May 29, 2013]. Retrieved from the Internet <URL:http://www.allgame.com/game.php?id=1968&tab=review>.
Restriction-Election Requirement for U.S. Appl. No. 13/729,493, dated Mar. 30, 2015.
Response to Election/ Restriction for U.S. Appl. No. 13/729,493, dated May 7, 2015.
Non-Final Rejection (1) for U.S. Appl. No. 13/729,493, dated Jun. 26, 2015.
Response after Non-Final Action (1) for U.S. Appl. No. 13/729,493, dated Sep. 25, 2015.
Non-Final Rejection (2) for U.S. Appl. No. 13/729,493, dated Dec. 7, 2015.
Response after Non-Final Action (2) for U.S. Appl. No. 13/729,493, dated Mar. 7, 2016.
Final Rejection for U.S. Appl. No. 13/729,493, dated May 25, 2016.
Response after Final Action for U.S. Appl. No. 13/729,493, dated Oct. 25, 2016.
Notice of Allowance for U.S. Appl. No. 13/729,493, dated Dec. 16, 2016.
Response to Reasons for Allowance for U.S. Appl. No. 13/729,493, dated Mar. 14, 2017.

* cited by examiner

METHOD AND SYSTEM FOR TEACHING VOCABULARY

RELATED APPLICATION

This application is a continuation of U.S. application Ser. No. 10/319,254, filed on Dec. 12, 2002 (now issued as U.S. Pat. No. 7,182,600), which claims the benefit under 35 U.S.C. §119(e) of U.S. Provisional Application No. 60/340,514, filed Dec. 13, 2001, and entitled "Method and System for Teaching Vocabulary." The entire contents of each of the above-referenced applications are hereby incorporated by reference in its entirety.

APPENDICES A, B, AND C

Appendices A, B, and C are attached hereto and form part of the application as filed.

FIELD OF THE INVENTION

The present invention relates to a system and method for teaching vocabulary, more particularly to teaching math vocabulary.

BACKGROUND OF THE RELATED TECHNOLOGY

An educational approach using spatial-temporal reasoning, making a mental image and projecting it ahead in space and time by performing a temporal sequence of spatial operations on that image, is an alternative approach to the traditional language-based education. Spatial-temporal software is used to help persons learn math concepts by using a spatial temporal approach. Spatial-temporal software includes, but is not limited to, software games designed to train students to use spatial-temporal abilities to conceptually learn and understand math concepts. "Keeping Mozart in Mind" by Gordon L. Shaw, Ph.D. (Academic Press 2000) and Appendix A provide some examples of spatial-temporal software. "Keeping Mozart in Mind" by Gordon L. Shaw, Ph.D. (Academic Press 2000) is incorporated by reference in its entirety herein. Spatial-temporal software includes a broader range of software than those disclosed in Gordon L. Shaw's book and Appendix A. In some situations, spatial-temporal software teaches math concepts to persons that unsuccessfully attempted to learn those math concepts through traditional language-based approach. In some situations, spatial-temporal software teaches math concepts to persons; however, the standardized test scores of those persons fail to reflect their knowledge of those math concepts. Accordingly, a method and system are needed to increase a person's test scores to reflect the proficiency demonstrated by the spatial-temporal software. Embodiments of the present invention seek to overcome some or all of these and other problems.

SUMMARY OF CERTAIN INVENTIVE ASPECTS

In an aspect of an embodiment of the invention, a language-based test that is designed to test concepts (e.g., math concepts or the like) and spatial-temporal software that is configured to teach some or all of those concepts are provided. A list of vocabulary terms is advantageously provided, wherein some or all of the terms appear in the language-based test. In another aspect, a set of flashcards advantageously uses a set or subset of the list of vocabulary terms and optionally combines the set or subset with corresponding portions (e.g., math concepts, game concepts or the like) of the spatial-temporal software. In another aspect, a story advantageously uses a set or subset of the list of vocabulary terms and optionally combines the set or subset with corresponding portions of the spatial-temporal software. For example, in a preferred embodiment, a student advantageously plays a spatial-temporal software game and consequently learns some or all of the concepts tested in a language-based test. Where the student is unfamiliar with the vocabulary terms associated with the learned concepts, the student advantageously reviews the flashcards and/or advantageously reviews the story to associate the vocabulary terms with the learned concepts. Consequently, the student learns the definitions of the vocabulary terms, and where a student's past performance on language-based tests has been low from an inadequate vocabulary, the student's performance on language-based tests improves.

In another embodiment of the invention, the spatial-temporal software is provided in which a set or subset of the terms from the list of the vocabulary terms is associated with corresponding portions of the spatial-temporal software. For example, in an illustrative embodiment, a set or subset of the terms from the list of vocabulary terms is advantageously displayed within a spatial-temporal software game along with other portions of the software for the purpose of helping the student playing the game associate the vocabulary terms with the corresponding portions of the software. Consequently, the student learns the definitions of the vocabulary terms, and where a student's past performance on language-based tests has been low from an inadequate vocabulary, the student's performance on language-based tests improves.

For purposes of summarizing the invention, certain aspects, advantages and novel features of the invention have been described herein. Of course, it is to be understood that not necessarily all such aspects, advantages or features will be embodied in any particular embodiment of the invention.

DETAILED DESCRIPTION OF THE CERTAIN INVENTIVE EMBODIMENTS

Figure 1:
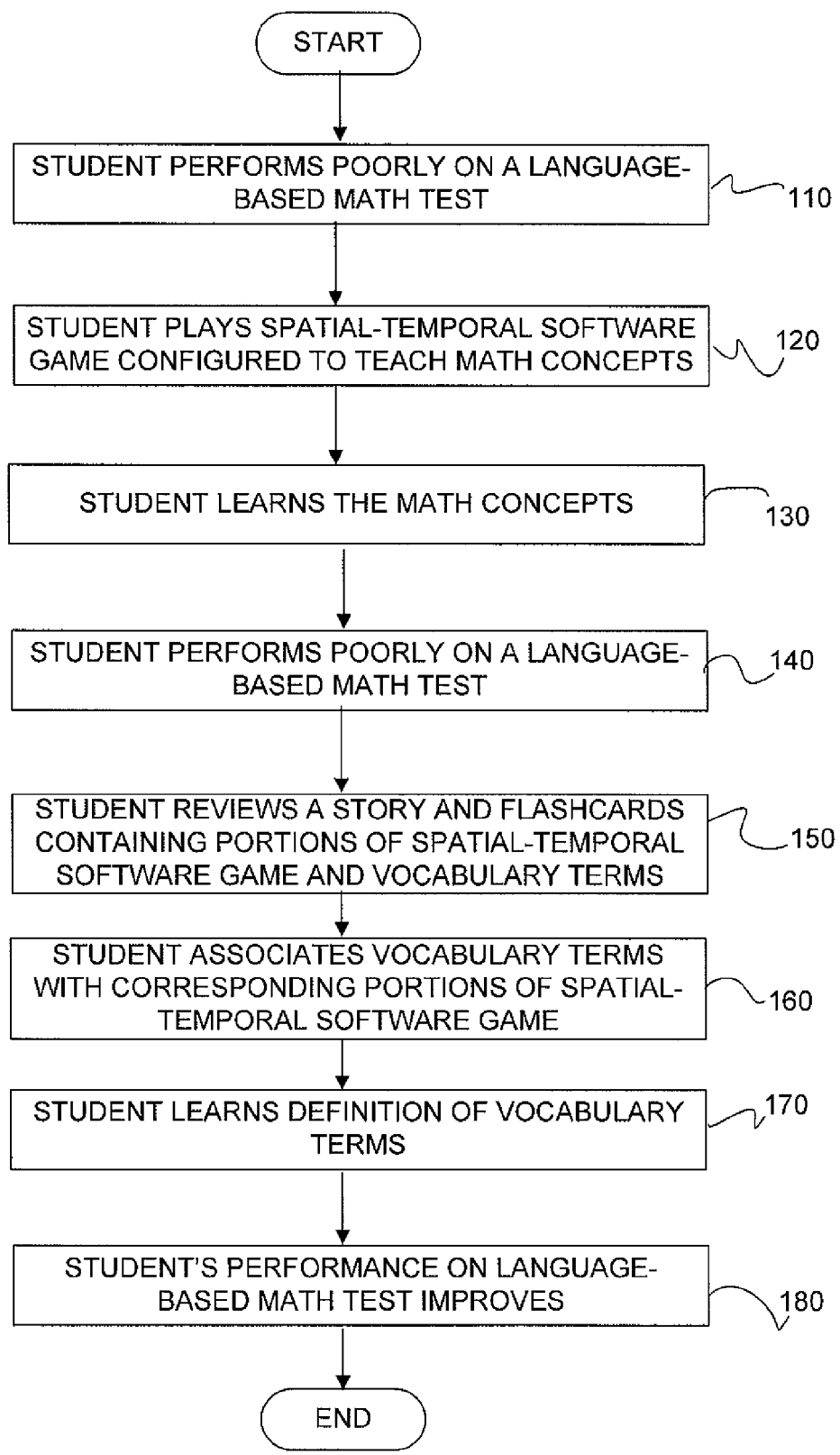
FIG. 1 is a flowchart illustrating a method in accordance with an embodiment of the invention.

The drawings and the following descriptions are provided to illustrate embodiments of the invention and not to limit the scope of the invention.

In some situations, spatial-temporal software teaches math concepts to persons that unsuccessfully attempted to learn those math concepts through traditional language-based approach. For some persons, spatial-temporal software teaches math concepts to the persons; however, the language-based test scores of those persons fail to reflect their knowledge of those math concepts. For example only and not to limit the scope of the invention, a child may lack certain language skills. In that situation, a low score from a language-based, standardized test score reflects that child's lack of the knowledge of the language and not the child's true understanding of the math concepts that are being tested. For example only and not to limit the scope of the invention, in another instance, the child lacks certain language skills because the child speaks a first language and the standardized test is in a secondary language.

In one embodiment of the invention, a list of vocabulary terms is provided, wherein the terms appear in a targeted test. For example only and not to limit the scope of the invention, a standardized, language-based is the targeted test. An example of a list of vocabulary terms is provided in the index of the story of Appendix B, and is intended as an example only and not to limit the scope of the claimed invention. In a preferred embodiment, the list of vocabulary terms comprises the list of vocabulary terms provided in the index of the story of Appendix B. In another embodiment, the list of vocabulary terms comprises at least fifty percent of the list of vocabulary terms provided in the index of the story of Appendix B; however, other percentages greater than fifty percent may be used in this embodiment. In another embodiment, a list of vocabulary terms comprises any suitable combination of vocabulary terms found in standardized tests, textbooks, sample exams, practice exams, practice books, or any math-related medium. In the situation where the standardized test score fails to reflect the knowledge of the person, the list of vocabulary terms may be used to help to bridge the difference between the person's knowledge and the standardized test score. Lists may be used for purposes beyond improving standardized, language-based test performance.

In another embodiment on the invention, flashcards are provided, wherein the flashcards use a set or subset of the terms from the list of vocabulary terms. In the situation where the standardized test score fails to reflect the knowledge of the person, the flash cards may help to bridge the difference between the person's knowledge and the standardized test score. Flashcards may be used for purposes beyond improving standardized, language-based test performance. Flashcards may be displayed and provided in any suitable means, including, but not limited to, software display, an Internet document format, and tangible cards. Flashcards are provided in Appendix C, and are intended as examples only and not to limit the scope of the claimed invention.

In another embodiment of the invention, flashcards are provided in which a set or subset of the terms from the list of the vocabulary terms is combined with corresponding portions of the spatial-temporal software. Corresponding portions of the spatial-temporal software include, but are not limited to, the concepts, characters, visual elements, textual elements, audio elements, or any suitable sensory elements in software games. Through combining the vocabulary terms with portions of the spatial temporal software, the flashcards are used to learn vocabulary terms associated with the math concepts from the spatial-temporal math software. In the situation where the standardized test score fails to reflect the knowledge of the person, using the flashcards helps the person to bridge the difference between the person's knowledge and the standardized test score. Flashcards are provided in Appendix C, and are intended as examples only and not to limit the scope of the claimed invention.

In another embodiment of the invention, a story is provided in which a set or subset of the terms from the list of vocabulary terms are used. In another embodiment, a story is provided in which a set or subset of the terms in the list of vocabulary terms is combined with corresponding portions of the spatial-temporal software. Corresponding portions of the spatial-temporal software include, but are not limited to, the concepts, characters, visual elements, textual elements, audio elements, or any suitable sensory elements in software games. Through combining the vocabulary terms with portions of the spatial temporal software, the story is used to learn the vocabulary terms associated with the math concepts from the spatial-temporal math software. In the situation where the standardized test score fails to reflect the knowledge of the person, reading the story helps the person to bridge the difference between the person's knowledge and the standardized test score. Stories may be used for purposes beyond improving standardized, language-based test performance. Stories may be displayed in any suitable media, including, but not limited to, software display, an Internet document format, books, comic books, newspaper, and magazines. In another embodiment of the invention, vocabulary terms are displayed in text that is different from other text in the story in any suitable manner, including, but not limited to, a different font type, font style, font size, or font color. An example of a story is provided in Appendix B, and is intended as an example only and not to limit the scope of the claimed invention.

In another embodiment of the invention, a story and flashcards are provided in which a set or subset of the terms from the list of the vocabulary terms is used. In another embodiment of the invention, a story and flashcards are provided in which a set or subset of the terms from the list of the vocabulary terms is combined with corresponding portions of the spatial-temporal software. Portions of the software include, but are not limited to, the concepts, characters, visual elements, textual elements, audio elements, or any suitable sensory elements in software games. In the embodiments where a story and flashcards are provided, the flashcards and story may be provided in any combination of suitable forms of stories and flashcards. They may, but need not be, provided in the same form. In another embodiment, a story and flashcards are provided in a software format. In another embodiment, a spatial-temporal software game, a corresponding story, and corresponding flashcards are provided in a software format. In the embodiments where a story and flashcards are provided, the story and flashcards may share similar concepts, characters, visual elements, textual elements, audio elements, or any suitable sensory elements, which may or may not be embodied in a spatial-temporal software program.

In another embodiment of the invention, spatial-temporal software is provided in which a set or subset of the terms from the list of the vocabulary terms is associated with corresponding portions of the spatial-temporal software within the spatial-temporal software program itself, Portions of the software include, but are not limited to, the concepts, characters, visual elements, textual elements, audio elements, or any suitable sensory elements in software games. For example only and not to limit the scope of the invention, in one embodiment of the invention, a set or subset of the terms from the list of vocabulary terms may be displayed within a spatial-temporal software game along with other portions of the software for the purpose of helping the person playing the game associate the terms with the corresponding portions of the software. The vocabulary terms may be displayed in a similar manner to the way that a story would display them, or may be displayed in any suitable manner. In the situation where the standardized test score fails to reflect the knowledge of the person, using the software helps the person to bridge the difference between the person's knowledge and the standardized test score. Spatial-temporal software may be used for purposes beyond improving standardized, language-based test performance.

In another embodiment of the invention, the spatial-temporal software is provided in which the spatial-temporal software comprises certain concepts. In one embodiment of the invention, the spatial-temporal software comprises math concepts, which include addition, subtraction, multiplication, place value, fractions, measurement, probability, estimation, equations, symmetry, proportions, graphs, telling time, ratios, and any other suitable math concept. In one embodiment of the invention, the spatial-temporal software comprises game concepts, which include game tasks, game objectives, game processes, or any suitable element of the game. These games concepts may be, but need not be, designed to teach certain math concepts. The spatial temporal software may comprise other concepts than those listed herein.

In another embodiment of the invention, any combination of spatial-temporal software, a story, and flashcards are provided for a target age range, school level range, or other suitable group criteria. The range may contain one or more ages. The range may contain one or more school grade levels. While this embodiment may be created for a target age range, this embodiment may be used for remedial purposes for persons outside the target range, including, but not limited to younger children, older children, and adults. For example only and not to limit the scope of the invention, in a preferred embodiment, the list of vocabulary terms in the index of the story of Appendix B, the story of Appendix B, the spatial temporal software described in Appendix A, and the flashcards of Appendix C are used to target children in the second grade.

In another embodiment of the invention, the vocabulary list and the spatial-temporal software involve other areas of knowledge, including, but not limited to, the sciences.

In the embodiments of the invention, the software may be any suitable software and need not be limited to spatial-temporal software. In the embodiments of the invention, the software may be operated on any suitable system, comprising one or more suitable computing devices.

Figure 2:
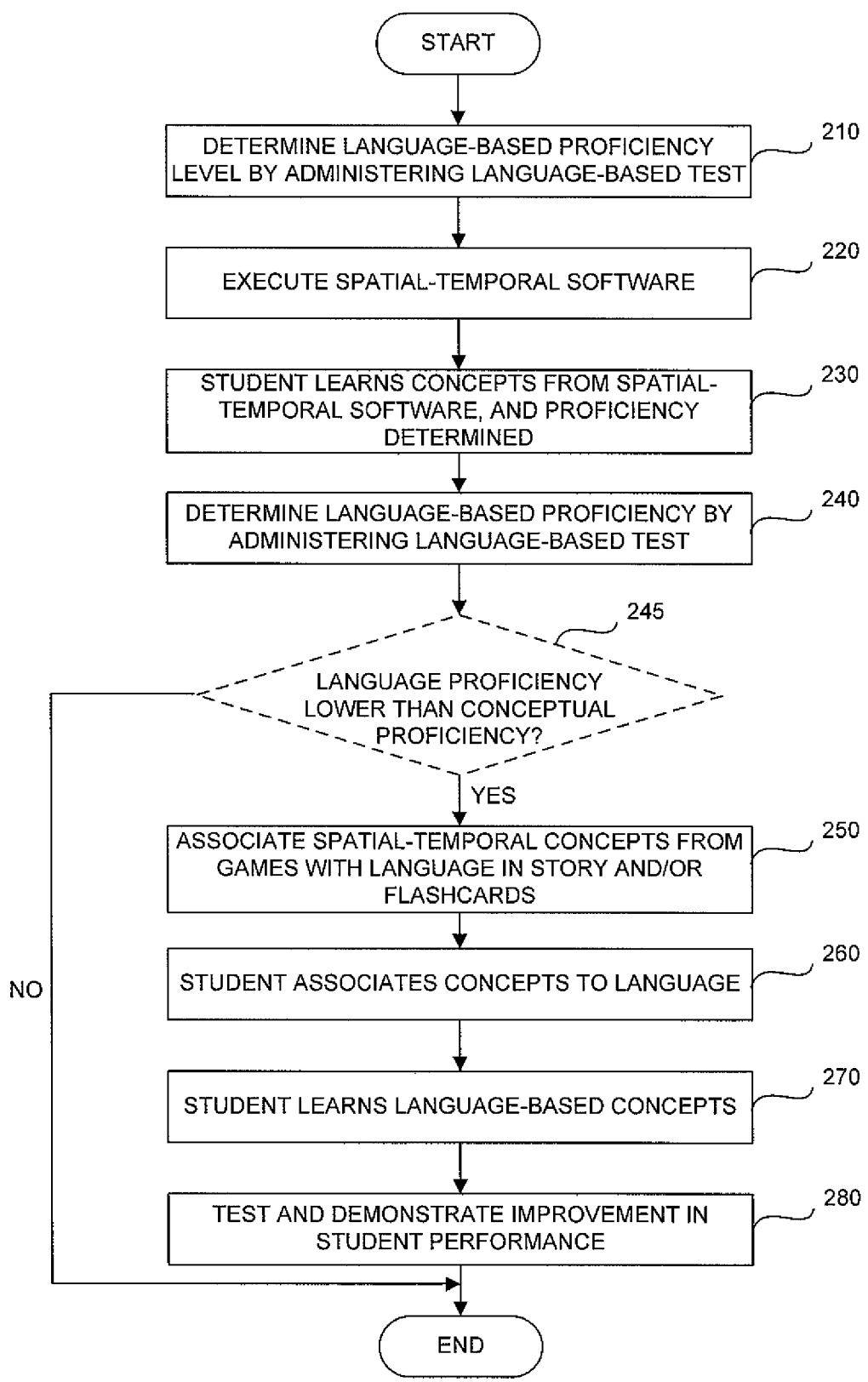
FIG. 2 is a flowchart showing an alternative embodiment of a method of teaching vocabulary.

For example only and not to limit the scope of the invention, a preferred embodiment of the invention is illustrated in FIG. 1 which provides a method for teaching vocabulary with an alternate embodiment illustrated in FIG. 2. At a block 110, a student performs poorly on a language-based test (e.g., a math test or the like). At a block 120, the student plays spatial-temporal software games configured to teach concepts embodied in the language-based test (e.g., math concepts or the like). For example, in one embodiment, a student in the second grade plays spatial-temporal software games described in Appendix A. Consequently, at a block 130, the student learns the concepts from the playing those spatial-temporal software games. The student's scores from those games are advantageously used by a teacher or suitable third-party consultant to assess the student's proficiency at the concepts embodied in the spatial-temporal software games.

As shown in FIG. 1, at a block 140, the student is given a language-based test to determine the student's proficiency at the concepts, which include concepts that were advantageously embodied in the spatial-temporal software games; however, at the block 140, the student receives a score on the language-based test that reflects a proficiency lower than what is reflected by the student's game scores. In this situation, the score from the language-based test reflects the student's lack of the knowledge of the language and not the student's true understanding of the tested concepts. As mentioned above, the student played the spatial-temporal software game and, consequently, had learned the concepts; however, because the student did not associate certain vocabulary terms with certain concepts, the student failed to achieve the language-based test scores that the student could have achieved.

As noted above, FIG. 2 is an alternate embodiment of the process illustrated in FIG. 1. The alternate process illustrated in FIG. 2 begins and proceeds to block 210, where a language-based proficiency level is determined by administering a language based test. Next, at block 220, spatial-temporal software is executed on a computing device. The process then moves to block 230, where the student learns concepts from the spatial-temporal software and a conceptual proficiency is determined. At block 240, a language-based proficiency is again determined by administering a language-based test. After administering the second language-based test, the language-based proficiency and the conceptual proficiency are compared at decision block 245. If the language proficiency is not lower than the conceptual proficiency, the process ends. If, however, the language proficiency is lower than the conceptual proficiency, the process them moves to block 250, where information is displayed in which spatial-temporal concepts are associated with language in the language-based test. At block 260, the student associates the concepts to the language, and as a result, at block 270, the student learns the language-based concepts. Finally, at block 280 an additional test may be given to the student to demonstrate improved performance.

As shown in FIG. 1, at a block 150, portions of the spatial-temporal software game are contained in the story and flashcards, and the student reads the story and reviews the flashcards. Consequently, at a block 160, the use of the story and flashcards help the student to associate the vocabulary terms with those portions. Thus, at a block 170, the student learns the definitions of the vocabulary terms, and the student's performance improves on a subsequent language-based test at a block 180. For example, in an embodiment, within the story and flashcards, the vocabulary terms are advantageously associated with one or more characters from the spatial temporal software game and advantageously associated with corresponding math concepts from the spatial temporal software game. Consequently, when reading or reviewing the story and flashcards, the student will associate those vocabulary terms with those already familiar math concepts and characters. In other embodiments, the vocabulary is advantageously associated with any suitable portion of the software to help the student learn the vocabulary, including, but not limited to, game concepts. As those associations are made, the student learns the vocabulary terms. By learning those vocabulary terms, the student's performance on the language-based tests is improved. The embodiments of the invention described herein may advantageously be used before the student takes a language-based test to help the student prepare for the test, may advantageously be used for preparation for any math test, and may advantageously be used as part of any suitable math education program.

For example only and not to limit the scope of the invention, in a preferred embodiment of the invention, a teacher provides a spatial-temporal software game for the student to play and learn math concepts. At this point, the student may or may not know the vocabulary terms that correspond to the math concepts. The teacher provides a reading assignment for the student as an after-school supplement to the in-class instruction. In a further embodiment, the reading assignment is from the story in Appendix B. In an additional embodiment, the teacher reviews the flashcards with the student in class. In a further embodiment, the flashcards are from Appendix C. Reviewing the flashcards from Appendix C and reading the story from Appendix B advantageously help the student to learn the vocabulary terms from the index of the story in Appendix B. Consequently, the student achieves a higher score on the language-based, standardized test.

For example only and not to limit the scope of the invention, in another preferred embodiment of the invention, the teacher provides a software application package to the student. The software application package comprises a spatial temporal software game, a story, and flashcards. The teacher instructs the student to play the spatial-temporal software game, read the story, and review the flashcards according to a suitable instruction plan chosen by the teacher.

Although this invention has been described in terms of certain preferred embodiments, other embodiments that are apparent to those of ordinary skill in the art, including embodiments which do not provide all of the benefits and features set forth herein, are also within the scope of this invention. Additionally, other combinations, omissions, substitutions and modifications will be apparent to the skilled artisan in view of the disclosure herein. Accordingly, the present invention is not intended to be limited by the reaction of the preferred embodiments, but is to he defined by reference to the appended claims.

Additionally, all publications, patents, and patent applications mentioned in this specification are herein incorporated by reference to the same extent as if each individual publication, patent, or patent application was specifically and individually indicated to be incorporated by reference.

What is claimed is:

1. A method of improving a student's score on a language-based test in a subject, the method comprising:
   teaching said subject by having the student play a spatial-temporal software game executing on a computing device, the game being configured to teach the subject using animated characters, wherein the spatial-temporal software game includes motion of spatial objects controllable by student input, wherein the spatial-temporal software game is configured to require the student to identify a temporal sequence of a plurality of student input actions that manipulate the spatial objects such that certain ones of the student input actions are available to the student only after certain other student input actions have been made by the student, and wherein the temporal sequence of actions comprises an input action sequence that satisfies a game objective corresponding to at least one concept of the subject;
   obtaining a score that assesses the student's proficiency in the concepts embodied in the spatial-temporal game;
   testing the student's proficiency in said subject using a language-based test executing on the computing device which is directed to the subject taught by the spatial-temporal software,
   comparing the spatial-temporal game scores assessing the student's proficiency in the concepts with the student's score from the language-based test to determine, via the computing device, if the test score reflects a proficiency lower than what is reflected by the student's spatial-temporal game scores,
   using the comparison of spatial-temporal game scores to language-based test scores to provide language and vocabulary instruction to said student concerning the language and vocabulary terms used in the language-based test, and
   re-testing the student using a language-based test executing on the computing device.

2. The method of claim 1 wherein said language and vocabulary instruction includes using flashcards involving language and vocabulary terms of said language-based test.

3. The method of claim 1 wherein said re-test of the student evaluates the performance of the student after receiving said language and vocabulary instruction.

4. The method of claim 1 wherein said re-test of the student evaluates the effectiveness of said language and vocabulary instruction.

5. A computer implemented method of teaching a child math vocabulary terms that correspond to math concepts that the child learns through the use of spatial-temporal software and for increasing the child's performance on language-based math tests, the method comprising:
   executing spatial-temporal software on a computing device having a computer processor, the software comprising math concepts and one or more characters, wherein the spatial-temporal software includes motion of spatial objects controllable by student input, wherein the spatial-temporal software is configured to require the student to identify a temporal sequence of a plurality of student input actions that manipulate the spatial objects such that certain ones of the student input actions are available to the student only after certain other student input actions have been made by the student, and wherein the temporal sequence of actions comprises an input action sequence that achieves an objective corresponding to at least one of the math concepts;
   generating output indicative of a story from the computing device, the story comprising the math concepts and the one or more characters; and
   displaying a visual output indicative of flashcards, the flashcards comprising math vocabulary terms that correspond to the math concepts of the spatial-temporal software, wherein the flashcards associate the math concepts of the spatial-temporal software with vocabulary terms of a language-based test,
   wherein the math concepts involve spatial-temporal reasoning.

6. The computer implemented method of claim 5, wherein the spatial-temporal software further comprises game concepts.

7. A non-transitory computer-readable medium containing software that, when executed, causes the computer to perform the acts of:
   executing software configured to teach a subject to a student using spatial-temporal concepts, wherein the software includes motion of spatial objects that are to be interactively controlled by the student in a chosen temporal order of plural actions that satisfies an objective corresponding to at least one concept of the subject, such that certain ones of the plural actions are available to the student only after certain other actions have been made by the student; and
   associating language-based concepts tested by a language-based test to corresponding spatial-temporal concepts in the software;
   determining a language-based proficiency level in the subject by administering the language-based test to the student;
   obtaining a spatial-temporal score that assesses the student's proficiency in the spatial-temporal concepts; and
   comparing the spatial-temporal score to the language-based proficiency level.

8. The computer-readable medium of claim 7, further containing software that, when executed, causes the computer to perform the acts of:
using the comparison of the score to the language-based proficiency level to provide language and vocabulary instruction to the student concerning the language-based concepts tested by the language-based test.

9. The computer-readable medium of claim 8, wherein said language and vocabulary instruction includes using flashcards involving language and vocabulary terms of the language-based test.

10. The computer-readable medium of claim 8, wherein the language and vocabulary instruction includes using stories in which the language and vocabulary terms of the language-based test are associated with one or more of the animated characters used in the spatial-temporal software game.

11. The computer-readable medium of claim 8, further containing software that, when executed, causes the computer to perform the acts of:
re-administering a language-based test to the student.

12. The computer-readable medium of claim 11, wherein the act of re-administering a language-based test evaluates the performance of the student after receiving the language and vocabulary instruction.

13. The computer-readable medium of claim 11, wherein the act of re-administering a language-based test evaluates the effectiveness of the language and vocabulary instruction.

14. A system for improving a student's score on a language-based test in a subject, comprising:
a first module configured to output data indicative of language-based concepts tested by the language-based test relating to the subject and further configured to output data indicative of spatial-temporal concepts relating to the subject, wherein the spatial-temporal concepts include motion of spatial objects controllable by student input, wherein the spatial objects are to be interactively controlled by a student in a chosen temporal order of a plurality of actions such that certain ones of the plurality of actions are available to the student only after certain other actions have been made by the student, and wherein the chosen temporal order of the plurality of actions satisfies an objective corresponding to at least one concept of the subject;
a second module configured to receive a plurality of inputs comprising a first input corresponding to data indicative of the language-based concepts and a second input corresponding to the data indicative of the spatial-temporal concepts, wherein the first input comprises a language-based proficiency level and the second input comprises a spatial-temporal proficiency level; and
a third module configured to compare the first input and the second input and, based on the comparison, output data related to the language and vocabulary terms used in the language-based test.

15. The system of claim 14, wherein the output data related to the language and vocabulary terms used in the language-based test comprises displayable flashcards having language and vocabulary terms of the language-based test.

16. The system of claim 14, wherein output data related to the language and vocabulary terms used in the language-based test comprises stories in which the language and vocabulary terms of the language-based test are associated with one or more animated characters.

17. The system of claim 14, further comprising a fourth module configured to present the language-based test to a user.

18. The system of claim 17, wherein results of the language-based test are used to analyze the effectiveness of the language and vocabulary instruction.

19. The method of claim 1, wherein the at least one concept of the subject is one of addition, subtraction, multiplication, place value, fractions, measurement, probability, estimation, equations, symmetry, proportions, graphs, telling time, and ratios.

20. The computer implemented method of claim 5, additionally comprising testing the math concepts by the language-based test.

21. The computer-readable medium of claim 7, wherein the chosen temporal order of plural actions is chosen by the student from a plurality of possible temporal orders of plural actions that satisfy the objective.

22. The system of claim 14, wherein the chosen temporal order of a plurality of actions is one of a plurality of possible temporal orders of the plurality of actions that satisfies the objective.

23. A non-transitory computer-readable medium containing software that, when executed, causes the computer to perform the acts of:
executing software configured to teach a subject to a student using spatial-temporal concepts, wherein the software includes motion of spatial objects that are to be interactively controlled by the student in a chosen temporal order of plural actions such that certain ones of the plural actions are available to the student only after certain other actions have been made by the student, and wherein one of the spatial objects is capable of being controlled by the student independently of other spatial objects; and
associating language-based concepts tested by a language-based test to corresponding spatial-temporal concepts in the software;
determining a language-based proficiency level in the subject by administering the language-based test to the student;
obtaining a spatial-temporal score that assesses the student's proficiency in the spatial-temporal concepts; and
comparing the spatial-temporal score to the language-based proficiency level.

24. The computer-readable medium of claim 23, wherein the chosen temporal order of plural actions comprises an input action sequence that achieves an objective corresponding to at least one concept of the subject.

* * * * *